United States Patent

Khlebutin

[15] 3,683,363
[45] Aug. 8, 1972

[54] DEVICE FOR DEMONSTRATION OF CHESS PLAY

[72] Inventor: Gleb Sergeevich Khlebutin, ulitsa Bolshevistskaya, 200, kv. 30, Perm, U.S.S.R.

[22] Filed: Dec. 3, 1970

[21] Appl. No.: 94,743

[52] U.S. Cl............340/323, 273/136 A, 273/137 A
[51] Int. Cl..............................A63f 3/02, G08b 5/22
[58] Field of Search........340/323; 273/136 A, 137 A

[56] References Cited

UNITED STATES PATENTS 2,679,397  5/1954  Thacker................340/323 X

Primary Examiner—John W. Caldwell
Assistant Examiner—Michael Slobasky
Attorney—Holman & Stern

[57] ABSTRACT

A device for demonstration of chess play characterized in that each chessman carries an oscillatory circuit tuned to the frequency assigned to the name of the given chessman, and an inductance coil is provided under each square of the chessboard and connected to the output of a pulse oscillator furnishing exciting pulses to all inductance coils in succession, and to the input of a frequency selector which controls the actuating units of the demonstration board.

3 Claims, 5 Drawing Figures

DEVICE FOR DEMONSTRATION OF CHESS PLAY

BACKGROUND OF THE INVENTION

The invention relates to devices for displaying information on a demonstration board and, more particularly, to devices for demonstration of chess play.

DESCRIPTION OF PRIOR ART

There exist devices for demonstration of chess play, comprising a chessboard with chessmen, a demonstration board with actuating units and an auxiliary switching board on which prior to demonstration manual adjustments are made in accordance with the initial arrangement of the chessmen on the main chessboard. Identification of chessmen is by means of permanent magnets built into each chessman (in white chessmen the magnet faces the board with one pole, in black chessmen, with the opposite pole), and polarized relays, two such relays being provided under each square of the chessboard with the purpose of identifying the color of the chessmen. To identify the names of the chessmen five auxiliary relays are provided under each square of the chessboard; these relays receive a preliminary signal about the name of the chessman removed from some square of the chessboard and then (when the chessman in question is placed on the chessboard) the signal from one of two polarized relays and, after the button of the chess clock is depressed, supply a command to the actuating unit of the demonstration board (USSR Inventor's Certificate No. 85889, 1946, Cl. $77d3_{02}$). The existing device is disadvantageous in that it requires an additional switching board on which the adjustments must be made in accordance with the arrangement of the chessmen prior to demonstration. Besides, manual corrections have to be made when pawns are promoted to chessmen other than queen. Due to the presence of a large number of non-standard components such as four-position control relays with caging relays releasing the armatures of the control relays, four groups of relays which provide demonstration of long and short castling and two groups of the relays which provide demonstration of pawn queening the existing device is rather complex and, consequently, is not reliable enough.

SUMMARY OF THE INVENTION

An object of the present invention is to provide a simple and reliable device for demonstration of chess play, which does not require any preliminary adjustments on an auxiliary switching board or any corrections in the course of the game.

With this and other objects in view in the device for demonstration of chess play, according to the invention, each chessman on the chessboard carries an oscillatory circuit tuned to a frequency which is assigned to the name of the given chessman and an inductance coil is provided under each square of the chessboard, said inductance coil being coupled to the output of a pulse oscillator furnishing the exciting pulses to all inductance coils in succession and to the input of a filter unit which controls the actuating units of the demonstration board.

The actuating units of the demonstration board must preferably incorporate an actuating mechanism with a stator and rotor, the stator and rotor windings being connected to a power supply through gates, the control inputs of which are coupled to the output of the filter unit.

To increase the operating speed of the device the actuating unit may incorporate thirteen projectors connected to a power supply through gates the control inputs of which are coupled to the output of the filter unit.

BRIEF DESCRIPTION OF THE DRAWINGS

The invention will be better understood from the following description of its specific embodiments when read in connection with accompanying drawings, in which.

DESCRIPTION OF PREFERRED EMBODIMENTS

Figure 1:
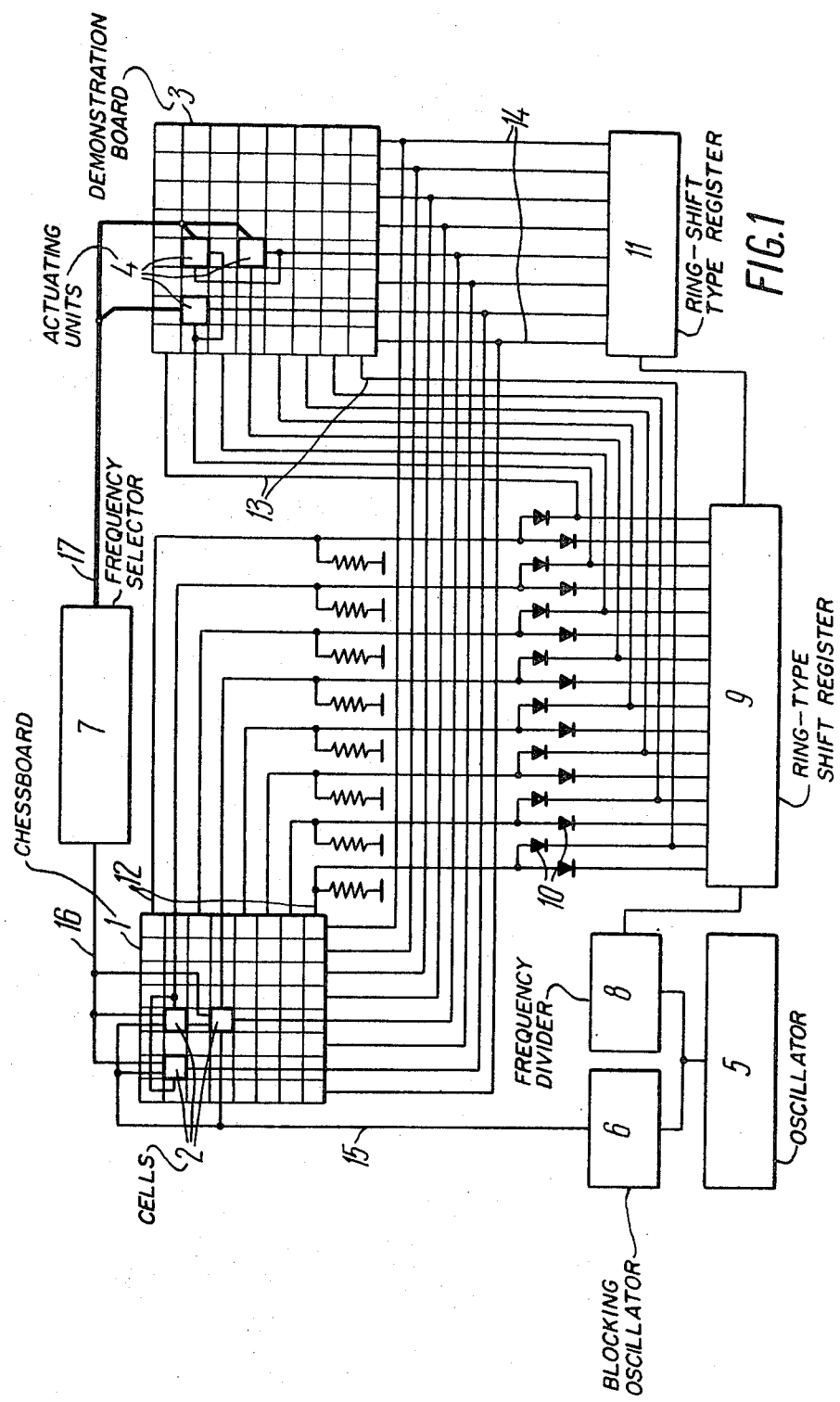
FIG. 1 is a block diagram of a device for demonstration of chess play according to the invention.

The present device comprises a chessboard 1 (FIG. 1) with cells 2, the number of which is sixty four (for simplicity's sake only three cells are shown in FIG. 1), each cell being associated with a definite square of the chessboard 1, a demonstration board 3 with actuating units 4, the number of which is also 64, each unit being associated with a definite square of the chessboard 1, a crystal oscillator 5, a blocking oscillator 6, a frequency selector or filter unit 7 made up of 12 tuned filters (each filter being associated with a definite chessman name), a frequency divider 8, a 16-stage ring-type shift register 9 with two groups of outputs (the first group being provided with decoupling diodes 10 and the second comprising each even output of the shift register 9) and an eight-stage ring-type shift register 11.

The first group of outputs of the ring-type shift register 9 is connected by wires 12 through decoupling diodes 10 to the cells 2 (each output of the first group is applied to eight cells 8 forming one rank of the chessboard). The second group of the outputs is connected by wires 13 to the actuating units 4. The outputs of the ring-type shift register 11 are connected by wires 14 to the cells 2 and the actuating units 4, so that each output is applied to the cells 2 and the actuating units 4 of a definite file of the chessboard 1 and demonstration board 3. The output of the blocking oscillator 6 is connected by a wire 15 to the inputs of the cells 2. The outputs of the cells 2 are connected by a wire 16 to the common input of the filter unit 7 and the outputs of the filter unit 7 are applied through a wire 17 to all actuating units 4.

Figure 2:
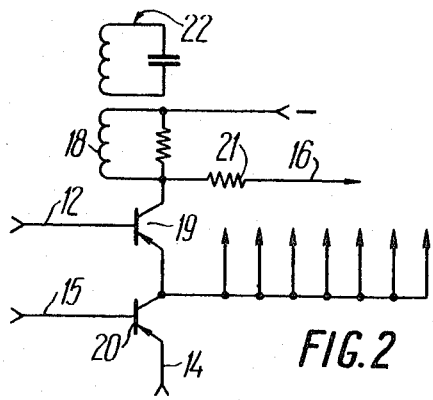
FIG. 2 is a schematic diagram of one cell of the chessboard, according to the invention.

Each cell 2 comprises an inductance coil 18 (FIG. 2) made up of several dozens of turns of winding wire, and placed under a definite square of the chessboard 1 (FIG. 1). All coils 18 (FIG. 2) are connected by the wire 15 through switching transistors 19 and 20 to the output of the blocking oscillator 6 (FIG. 1) so that the switching transistor 20 (FIG. 2), the base of which is coupled to the output of the blocking oscillator 6 (FIG. 1), is common to all eight cells associated with a definite file of the chessboard 1. Therefore the present device uses 64 switching transistors 19 (FIG. 2) and 8 switching transistors 20 which provide for successive application of the exciting pulses from the blocking oscillator 6 to all 64 coils 18 in response to the signals of the registers 9 and 11 (FIG. 1). The coils 18 are connected by the wire 16 to the common input of the filter unit 7 (FIG. 1) through decoupling resistors 21. An oscillatory circuit 22 is built into each chessman (FIG. 2). Each circuit 22 is tuned to a frequency assigned to a definite name of a chessman. Thus, 12 different frequencies (one for each name of a chessman) are used. The frequencies assigned to the names of the chessmen are made multiple of the repetition frequency of the pulses furnished by the blocking oscillator 6 (FIG. 1).

Figure 3:
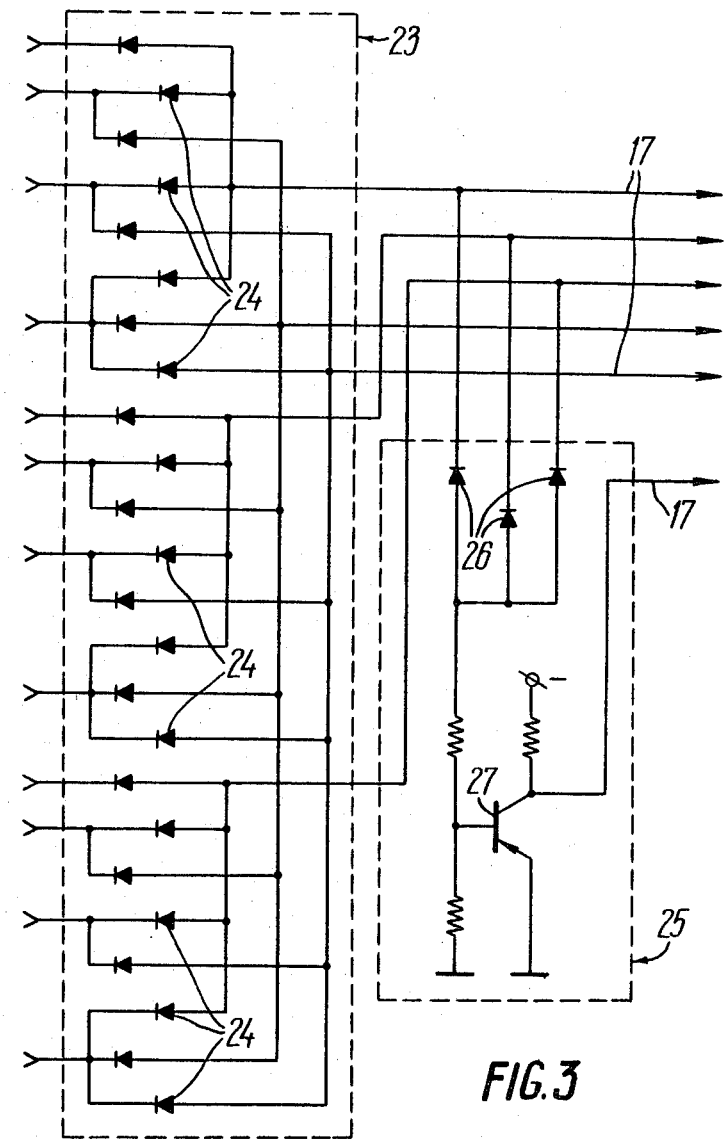
FIG. 3 is a schematic diagram of the output circuits of a filter unit, according to the invention.

The filter unit 7 comprises twelve tuned filters passing the frequencies assigned to the names of the chessmen, and input circuits shown schematically in FIG. 3. The input circuits comprise a coding assembly 23 formed by diodes 24, which convert the signal from one of the 12 tuned filters in the filter unit 7 (FIG. 1) to a simultaneous combination of one, two or three signals in five output wires 17 of the filter unit 7.

The output circuits also include an OR–ON logic element 25 (FIG. 3) which furnishes a signal to the actuating units 4 (FIG. 1) when no chessmen are present on the corresponding squares of the chessboard 1. The logic element 25 (FIG. 3) is formed by diodes 26 and a transistor 27. Placed at the output of the unit 7 (FIG. 1) are an amplifier with a high-resistance input and an automatic level control (not shown in FIG. 1).

The actuating unit 4 (FIG. 4) comprises an emitter follower 28, a transistor 29, a switching transistor 30 controlled by the shift registers 9 and 11, two relays 31 and 32 with contact assemblies 33 and 34, a rotor-type actuating mechanism 35, the windings of which are energized through gates. The gates are triode thyristors 36 the control electrodes of which are connected to the outputs 17 of the filter unit 7 through decoupling transistors 37 (FIG. 1).

Figure 4:
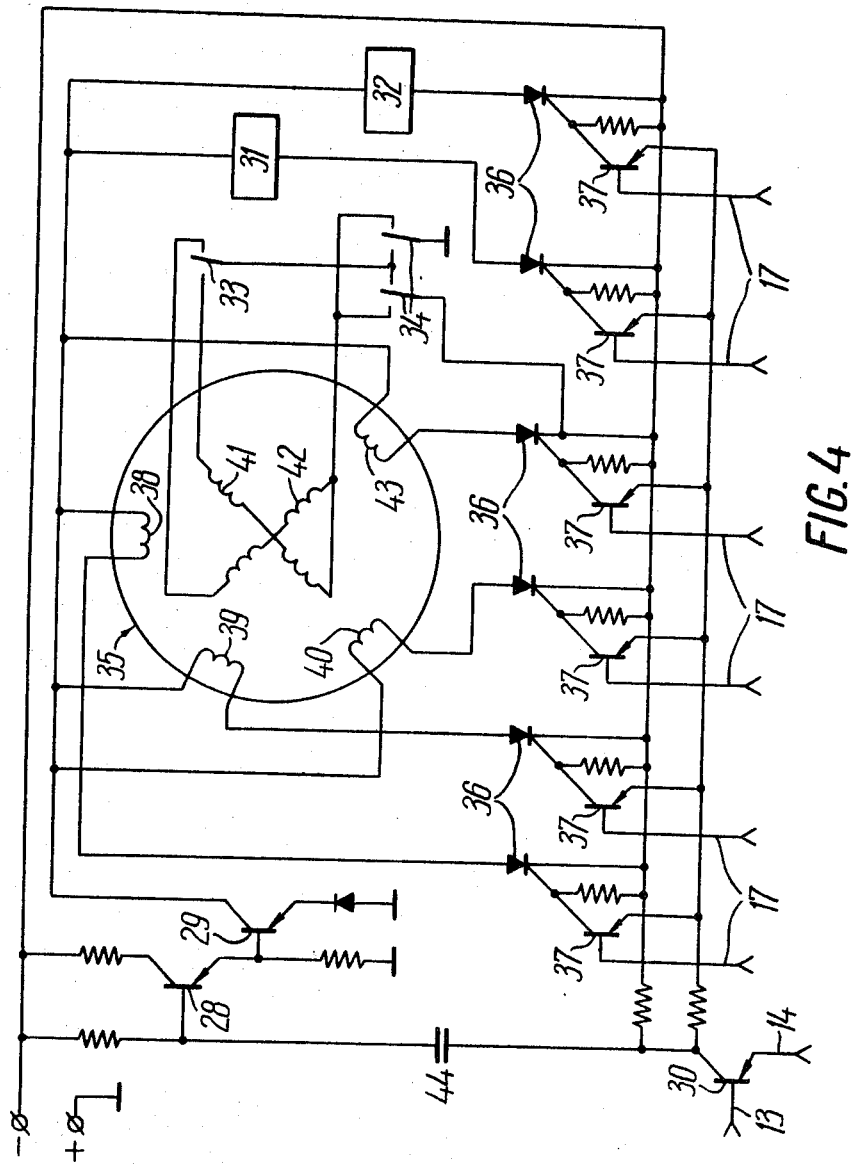
FIG. 4 is a schematic diagram of an actuating unit of the demonstration board, according to the invention.

The stator of the actuating mechanism 35 (FIG. 4) carries three operating windings 38, 39 and 40 at an angle of 120° to each other (for simplicity's sake only half windings are shown in FIG. 4); the rotor of the mechanism has two mutually perpendicular windings 41 and 42. Besides, an additional winding 43 is placed on the stator between the operating windings 39 and 38 to set the rotor in the neutral position when no chessman is present on the corresponding square of the chessboard 1 (FIG. 1).

The contact assemblies 33 and 34 of the relays 31 and 32 control the current in two rotor windings 41 and 42 (FIG. 4) so that the rotor of the actuating mechanism 35 may occupy four different positions (at an angle of 90°) when one of the three stator windings 38, 39, 40 is energized. All in all the rotor of the actuating mechanism 35 may be smoothly set to 12 different positions. There is a thirteenth position (between two operating ones), to which the rotor is set under the action of the stator winding 43 when a signal arrives from the logic element 25 (FIG. 3). The required combination of the signals furnished by the filter unit (to set the rotor in a position corresponding to the name of the chessman placed on the given square) is provided by the coding assembly 23. All thyristors 36 (FIG. 4) are turned off by the transistor 29, the base of which is connected to the collector of the switching transistor 30 through a capacitor 44 and the emitter follower 28. To reduce the turn-on and turn-off time of the thyristors 36 all stator windings 38, 39, 40, 43 and the coils of the relays 31 and 32 are bypassed by resistors not shown in FIG. 4. Also not shown in this figure are slip rings with brushes to supply current to the windings 41 and 42.

The rotor shaft of the actuating mechanism 35 in each actuating unit 4 carries a glass disk with photo images of 12 chessmen and a blank field (on 32 disks the chessmen are shown against a light background, on the other 32 disks, against a dark background). One of the images is projected onto a half-frosted screen with the help of a projection lamp, condenser and lens.

Figure 5:
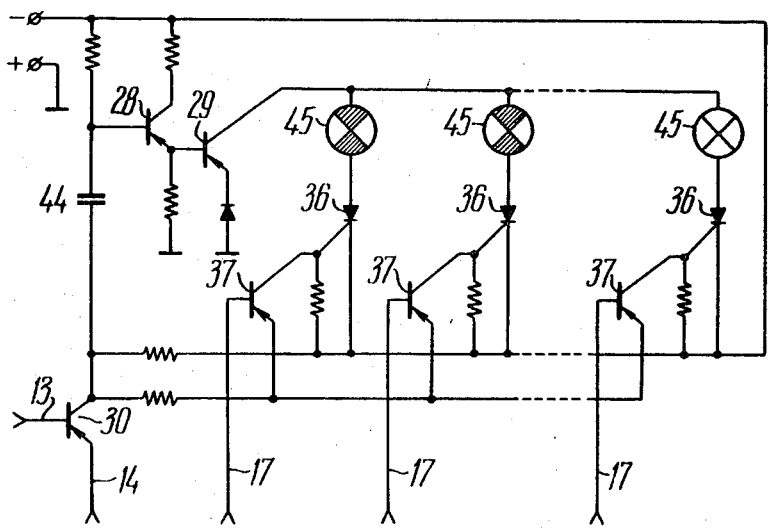
FIG. 5 is a schematic diagram showing another form of the actuating unit of the demonstration board, according to the invention.

In the second form of the actuating unit 4 shown in FIG. 5 the actuating mechanism 35 (FIG. 4) and the relays 31 and 32 are substituted with 13 projectors, each projector comprising a lens, a stationary slide with the image of a chessman, a condenser and a projection lamp 45 (FIG. 5).

The projection lamp 45 of each projector is turned on and off by the thyristor 36 which is controlled by the output signal of the filter unit 7 through the decoupling transistor 37 (FIG. 1). This arrangement does not require the coding assembly 23 (FIG. 3). All 12 outputs of the tuned filters must be applied to the actuating units 4 (FIG. 1). In this case the cable 17 must contain 13 wires (12 wires from the tuned filters and one wire from the logic element 25). Nine diodes 26 (from each output of the tuned filters) must be added to the logic element 25 (FIG. 3).

The device operates as follows.

When power is applied to the device the blocking oscillator 6 (FIG. 1) controlled by the crystal oscillator 5 begins to generate rectangular pulses with a duration of 5–6 $\mu$sec. The repetition frequency of these pulses may be varied within wide limits but in the present device it is made equal to 6.4 kilocycles. Simultaneously the frequency scaler 8 begins to furnish clock pulses at a frequency of 400 c.p.s. to the ring-type shift register 9. The output pulses of the 16-stage shift register 9 operate the ring-type register 11. The shift register 9 alternately furnishes negative pulses through its outputs 12 and 13, 5-millisec pulses being available from the outputs 12 and 2.5-millisec pulses delayed by 2.5 millisec, from the outputs 13. The shift register 11 successively furnishes positive pulses of 40-millisec duration at its outputs. The duration of these pulses in such as to enable the switching transistors 19 (FIG. 2) of all eight cells 2 (FIG. 1) comprised in a definite file of the chessboard 1 successively to be made conductive for 5 millisec by the negative pulses from the first group of outputs of the shift register 9 (FIG. 1). Similarly but with a lag of 2.5 millisec, the switching transistors 30 (FIG. 4) of eight actuating units 4 associated with said cells will be successively made conductive for 2.5 millisec.

The pulses generated by the blocking oscillator 6 (FIG. 1) are applied through the wire 15 to the bases of the transistors 20 (FIG. 2) of all eight files of the chessboard. However, at each instant of time only one of the transistors 20 (to the emitter of which a positive pulse is applied from the shift register 11) amplifies these pulses. The amplified pulses are applied to the inductance coils 18 through the switching transistors 19 so that at each given instant the pulses are fed to the coil 18 (FIG. 2) of only one cell 2 (FIG. 1) viz, the cell which simultaneously received a positive pulse (applied to the emitter of the transistor 20) from the shift register 11 and a negative pulses (applied to the base of the transistor 19) from the shift register 9. Thus the time period over which the exciting pulses are successively applied to the coils 18 (FIG. 2) of all cells of the chessboard and the switching transistors 30 (FIG. 4 and FIG. 5) of the corresponding actuating units of the demonstration board 3 (FIG. 1) are successively made conductive is equal to 320 millisec, i.e., slightly less than 13 seconds. Now follows a discussion of the operation of the cell 2 at the moment exciting pulses are fed to its coil 18 (FIG. 2). When a chessman is present on the square of the chessboard 1 associated with the cell 2 (FIG. 1) in question the oscillatory circuit 22 (FIG. 2) develops damped oscillations at a frequency to which the circuit 22 is tuned, i.e. at a frequency assigned to the name of the given chessman. In the interval between the pulses of the blocking oscillator 6 (FIG. 1) the coil 18 receives the damped oscillations of the circuit 22 (FIG. 2) which are applied through a decoupling resistor 21 and the wire 16 to the input of the filter unit 7 (FIG. 1). Having been selected by one of the 12 tuned filters the damped oscillations of the circuit 22 (FIG. 2) are detected and then converted by the coding assembly 23 (FIG. 3) to a simultaneous combination of one, two, or three signals at the five outputs of the filter unit 7 (FIG. 1), 1), these signals being used to control the actuating mechanism 35 (FIG. 4) of the corresponding actuating unit 4 (FIG. 4). During 2.5 millisec from the instant the cell 2 begins to operate none of the decoupling transistors 37 (FIG. 4) of all 64 actuating units 4 (FIG. 1) can pass the signal to make the transistors 36 (FIG. 4) conductive even in the presence of the signals from the filter unit 7 (FIG. 1) as all the switching transistors 30 (FIG. 4) are cut off. In 2.5 millisec (when all transients terminate in the filter unit 7 (FIG. 1) a negative pulse is applied from the shift register 9 to the base of the switching transistor 30 (FIG. 4) of the corresponding actuating unit 4 (FIG. 1), making this transistor conductive. The differentiated pulse passes through the capacitor 44 and the emitter follower 28 to the base of the transistor 29. The latter becomes non-conductive for a time sufficient for all thyristors 36 to turn off. As a result the thyristors 36 turn off and the transistor 29 is again made conductive. After this the signals from the filter unit 7 (FIG. 1) turn on one of the thyristors 36 (FIG. 4) which control the windings 38, 39, 40 of the actuating mechanism 35 and one, or two, or none (depending on the name of chessman) of the thyristors 36 which control the coils of the relays 31, 32. The rotor of the actuating mechanism 35 smoothly moves to a position corresponding to the chessman set on the corresponding square of the chessboard 1. The image of the chessman is thus placed between the lens and the condenser to be projected onto a semi-frosted screen.

When no chessman is present on the square of the chessboard 1, the signal from the logic element 25 (FIG. 3) turns on the thyristor 36 (FIG. 4) which controls the winding 43 of the actuating mechanism 35, and the rotor of the mechanism will move to a neutral position. During operation of the other 63 actuating units 4 (FIG. 1) the information is retained on the given actuating unit 4 by the thyristors 36.

The device operates almost in exactly the same manner when the second form of the actuating unit 4 is employed. In this case there is no need for the coding assembly 23 (FIG. 3). The operating speed of the device is increased. If a change occurred on some square of the chessboard 1 (FIG. 1) in the course of the sampling cycle, it will be displayed on the demonstration board 3 in not later than one-third of a second. This enables the chess play to be demonstrated no matter how hard the players are pressed for time.

The device provided by the present invention possesses a number of advantages. One of the advantages is that it does not require preliminary adjustments to be made on an auxiliary switching board in accordance with the arrangement of the chessmen. There is no need for manual correction in the course of the game when pawns are promoted to chessmen other than queen. The absence of non-standard components (in the second embodiment) considerably simplifies the manufacture and improves the reliability of the device.

What is claimed is:

1. A device for demonstration of chess play, comprising a chessboard with chessmen; a demonstration board; a supply unit; actuating units of said demonstration board, the number of which is equal to 64; oscillatory circuits, the number of which is equal to the number of said chessmen, each oscillatory circuit being built into one of said chessmen and tuned to a frequency assigned to the name of the name of the given chessman; inductance coils, the number of which is equal to 64, each coil being mounted under one of the squares of said chessboard; a pulse oscillator, the output of which is connected to the inputs of said inductance coils to apply exciting pulses to all inductance coils in succession; a filter unit which controls said actuating units of said demonstration board, the input of said filter unit being connected to the outputs of said inductance coils.

2. A device as claimed in claim 1 wherein said actuating unit of said demonstration table comprises an actuating mechanism with a stator and a rotor, the stator and rotor windings being connected to said power supply through gates, the control inputs of which are coupled to the output of said filter unit.

3. A device as claimed in claim 1 wherein said actuating unit of said demonstration board comprises thirteen projectors connected to said power supply through gates, the control inputs of which are coupled to the output of said filter unit.

* * * * *